United States Patent [19]

Reinecke

[11] Patent Number: 4,519,266

[45] Date of Patent: May 28, 1985

[54] GEAR SELECTOR UNIT FOR A TRANSMISSION

[75] Inventor: Erich Reinecke, Burgdorf, Fed. Rep. of Germany

[73] Assignee: WABCO Fahrzeugbremsen GmbH, Hanover, Fed. Rep. of Germany

[21] Appl. No.: 420,079

[22] Filed: Sep. 20, 1982

[30] Foreign Application Priority Data

Sep. 30, 1981 [DE] Fed. Rep. of Germany ....... 3138827

[51] Int. Cl.³ .................. G05G 9/00; B60K 20/00; H01H 9/06; H01H 9/00
[52] U.S. Cl. ........................ 74/471 XY; 74/473 R; 74/475; 200/61.88; 335/206; 335/207
[58] Field of Search .......... 74/473 R, 471 XY, 475; 200/6 A, 61.88, 61.28, 61.85; 335/205, 206, 207; 340/365 L, 709

[56] References Cited

U.S. PATENT DOCUMENTS

| | | | |
|---|---|---|---|
| 3,844,305 | 10/1974 | McCormick | 335/206 X |
| 4,022,078 | 5/1977 | Malott | 335/206 X |
| 4,063,217 | 12/1977 | Hyde et al. | 200/61.88 X |
| 4,155,068 | 5/1979 | Zajichek | 200/61.88 X |
| 4,187,483 | 2/1980 | Whitney | 335/206 |
| 4,438,657 | 3/1984 | Nobis | 74/473 R X |

FOREIGN PATENT DOCUMENTS

| | | | |
|---|---|---|---|
| 1188166 | 3/1965 | Fed. Rep. of Germany | 335/206 |
| 2341797 | 2/1975 | Fed. Rep. of Germany | 74/473 R |
| 164417 | 12/1981 | Japan | 200/61.88 |

Primary Examiner—Allan D. Herrmann
Assistant Examiner—Stephen B. Andrews
Attorney, Agent, or Firm—G. J. Falce

[57] ABSTRACT

A gear shift position sensing arrangement for a gear selector unit that selects the transmission gears indirectly. Magnetic sensors are arranged in the gear selector unit housing so as to be activated when a permanent magnet associated with the gear shift lever is brought into magnetic proximity therewith.

4 Claims, 20 Drawing Figures

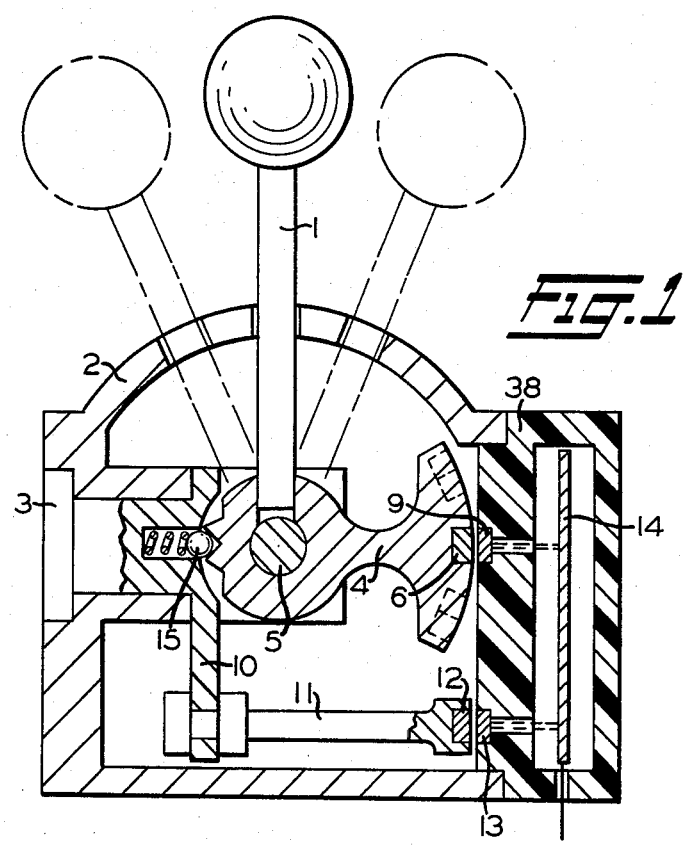
Fig.1
Fig.4
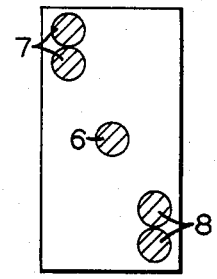
Fig.5
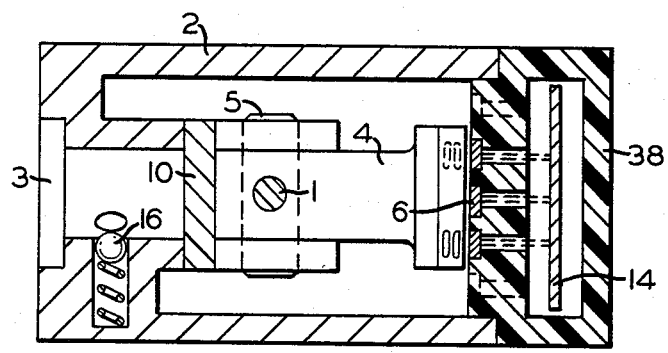
Fig.6
Fig.2
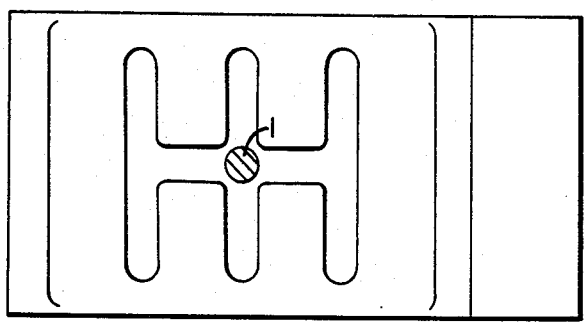
Fig.3

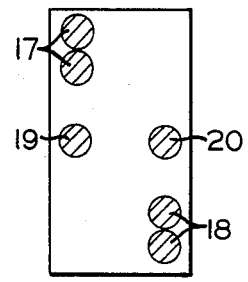
Fig.10
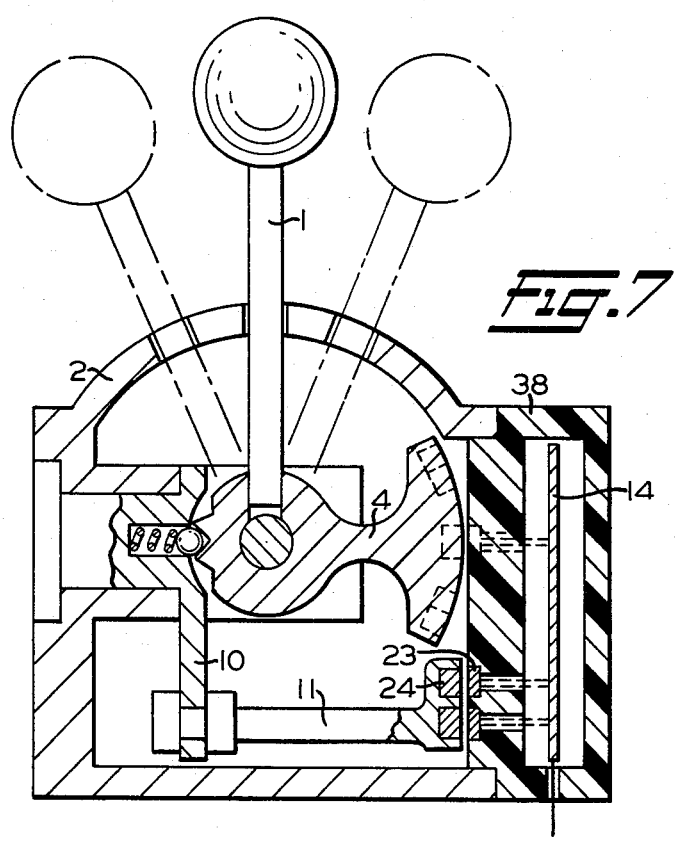
Fig.7
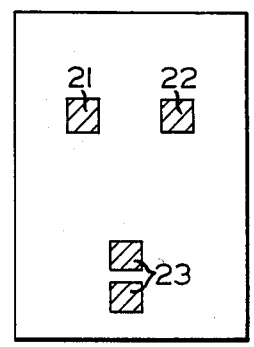
Fig.11
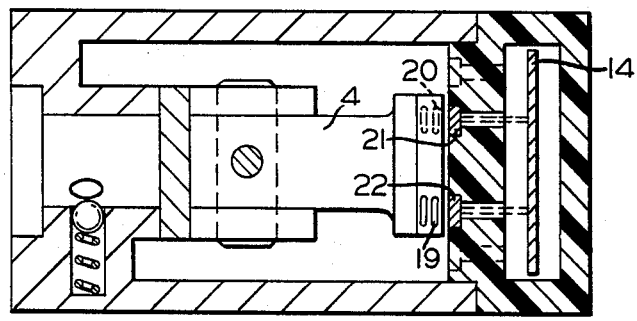
Fig.12
Fig.8
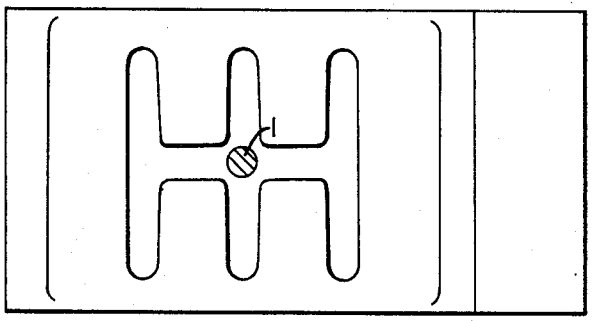
Fig.9

GEAR SELECTOR UNIT FOR A TRANSMISSION

BACKGROUND OF THE INVENTION

The invention relates to a gear selector unit for a transmission in motor vehicles, and particularly to a gear selector unit for indirectly operated transmissions.

In indirectly operated transmissions, the gears are engaged by operating cylinders, which are generally located in the transmission. To control the supply of fluid pressure to the operating cylinders, solenoid valves are provided. These solenoid valves are controlled in accordance with the position of a gear shift lever, and may be further influenced by other data, such as the gear engagement and disengagement speed. The data are generally put into an electronic system, and must therefore be available as electrical values. It is therefore necessary to sense the position of the gear selector lever, which corresponds to the desired gear, and to convert it into a corresponding electrical signal.

Sensing the position of a gear shift lever by means of microswitches is already known. The microswitches here, however, are not activated directly by the gear shift lever, but by a gear shift lever shaft which can be adjusted by the shift lever. By means of the signals of the microswitches, there is a servo-support of the gear-shifting process by means of an electronic system and an operating cylinder.

SUMMARY OF THE INVENTION

The object of the invention is to provide a gear selector of the type described above, which utilizes non-wearing parts in the detection of the positions of a gear shift selector to obtain greater reliability and extended service life.

This problem is solved by the invention described in patent claim 1. The sub-claims contain corresponding configurations of the invention.

BRIEF DESCRIPTION OF THE DRAWINGS

The invention is described in more detail below on the basis of drawings in which several examples of the invention are illustrated.

The drawings show in:

FIGS. 1 to 6, a first example of a gear selector as described by the invention.

FIGS. 7 to 12, a variant of the first example with a reduced number of sensors.

DESCRIPTION AND OPERATION

Figure 13:
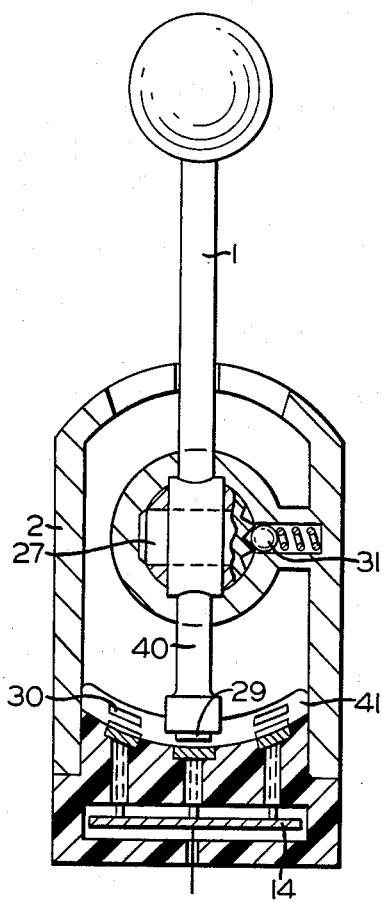
FIGS. 13 to 16, a second example of a gear selector as described by the invention.
Figure 14:
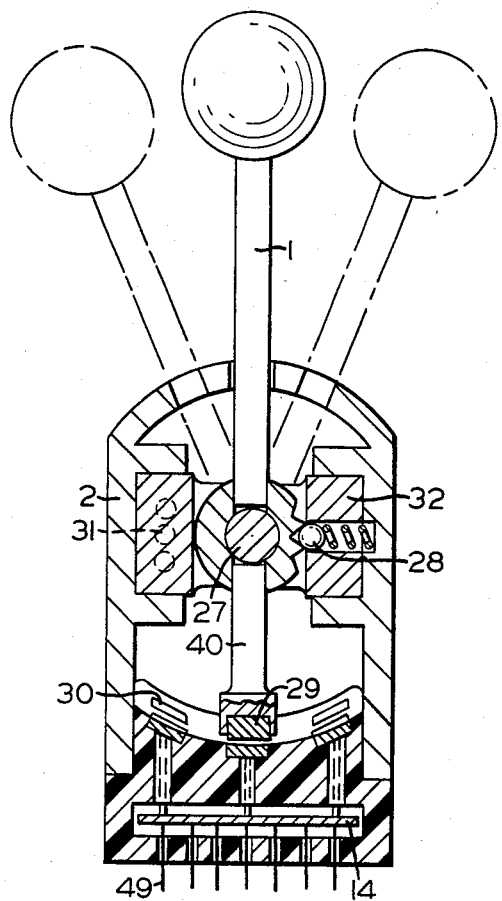
Figure 15:
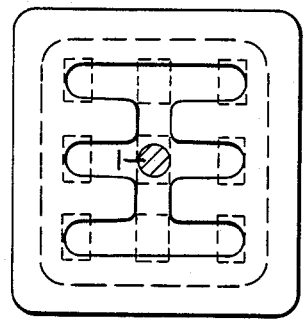
Figure 16:
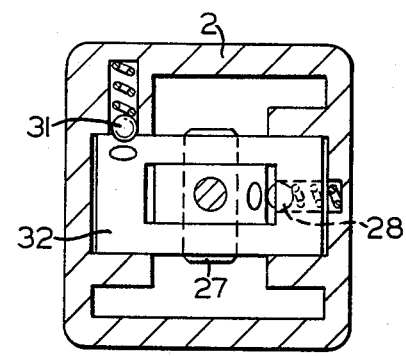

As can be seen from FIG. 1, the gear selector unit consists of a housing 2, from which a gear shift lever 1 projects. The gear shift lever 1 can be moved in the plane of the drawing to select the shift path and perpendicular to the plane of the drawing to select the gear. The individual gears are arranged in the known double-H form (see FIG. 3). The gear shift lever 1 is connected inside the housing 2 to achieve the mentioned movement by means of gimbals. To select the desired gear, the gear shift lever 1 can be rotated around the axis of a shaft 3 that is perpendicular to the axis of a shaft 5. Both rotations can be stopped in all three positions. For this purpose, ball-type detents 15 and 16 are provided.

To sense the shift path selected, attached to the gear shift lever 1 is an arm 4, which can pivot around the axis of shaft 5, which arm has several permanent magnets 6, 7, 8 on an arcuate-shaped end. As shown in FIG. 4, these permanent magnets are arranged in three rows, perpendicular to one another. In a side wall 38 of the housing 2, there are several sensors 9, 13 which are sensitive to a magnetic field. In the illustrated position of the gear shift lever 1 (neutral position), the middle sensor 9 is activated by the magnet 6. In the left position of the gear shift lever 1, the left one of the three sensors 9 is activated by the magnet 8, and in the right limit position of the gear shift lever 1, the right one of the three sensors 9 is activated by the magnet 7. The magnets 7 and 8 are therefore duplicated, since the activation of the sensors must also take place during a rotation around the axis 3.

To sense the gear which has been selected, there is an angle arm 10, 11 attached to shaft 3. At the end of the rod 11, a permanent magnet 12 is attached (see FIG. 6). The permanent magnet 12 is used to activate three sensors 13. In the llustrated neutral position (see FIG. 3), the middle of the three sensors 13 is activated.

Accordingly, when the gear shift lever 1 is pivoted perpendicular to the plane of the drawing, the right or left of the sensors 13 is activated. The gear which has been selected can therefore be identified.

The sensors 9, 13 are housed in the side wall 38. They have an electrical connection to a bar 14. The latter also holds other electronic components, which are necessary for evaluating the signals from the sensors.

Instead of a separate side wall 38, this can also be formed directly by the bar 14 (not shown).

FIG. 2 is an overhead view of FIG. 1 showing the detent device 16 for shaft 3 of gear shift lever 1.

Since the sensors which are sensitive to magnetic fields are relatively expensive, and the magnets are relatively inexpensive, a variant of the gear selector shown in FIGS. 1 to 6 arranges the magnets and sensors in a manner different from that described above.

This variant is illustrated in FIGS. 7 to 12. In contrast to the arrangement described above, the permanent magnets 17 to 20 on the semi-circular end portion of the arm 4 are arranged in two perpendicular rows (FIG. 10). Two sensors 21, 22 located next to one another correspond to these magnets.

The permanent magnets on the end of the arm 11 are, as shown in FIG. 12, arranged on a circular sector on two different radii. Corresponding to these magnets 24 to 26 are two sensors 23, which are perpendicularly on top of one another.

In the neutral position shown (FIG. 9), the sensors 21 and 22 are activated by the magnets 19 and 20 and the sensors 23 by the magnets 24.

Compared to the arrangement shown in FIGS. 1 to 6, two sensors sensitive to magnetic fields have been eliminated.

FIG. 8 shows once again an overhead view of FIG. 7. It can be seen that here, only two magnets 19, 20 and sensors 22, 21 are arranged next to one another on the end of the arm 4. Otherwise, FIG. 8 is the same as FIG. 2.

In FIGS. 13 to 16, another configuration of the gear selector unit is illustrated. It consists of a housing 2, into which a gear shift lever 1 projects. The latter is again suspended on gimbals. To select the shift path, the gear shift lever 1 can pivot around the axis of a shaft 27 perpendicular to the plane of the drawing. This pivoting movement can be stopped in three places by a ball-type detent 28 (see FIG. 16). To select the gear (see FIG. 15), the gear shift lever 1 can be rotated around a shaft 32. The three positions in this movement are determined by a ball-type detent 31.

Instead of a gimbal mounting, a bearing which is designed as a ball-and-socket joint is also possible (not shown).

To identify the gear which has been selected, the gear shift lever 1 is extended below the gimbal suspension by an extension 40, which has a permanent magnet 29 at its end. The corresponding sensors 30 are arranged below the magnet 29 on a spherical-shaped end cap 41. Thereby, each gear corresponds to its own sensor.

The sensors are connected to a bar 14, which also has other electronic components. The electrical connection to the bar 14 is made by means of a plug device 49. One advantage of the construction, as illustrated in FIG. 13, is the small dimensions of the gear selector in comparison with FIG. 1.

Figure 17:
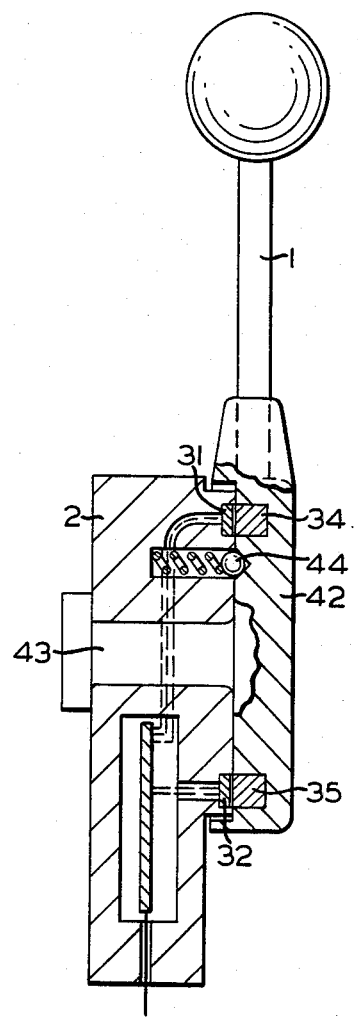
FIGS. 17 and 18, a third example.
Figure 18:
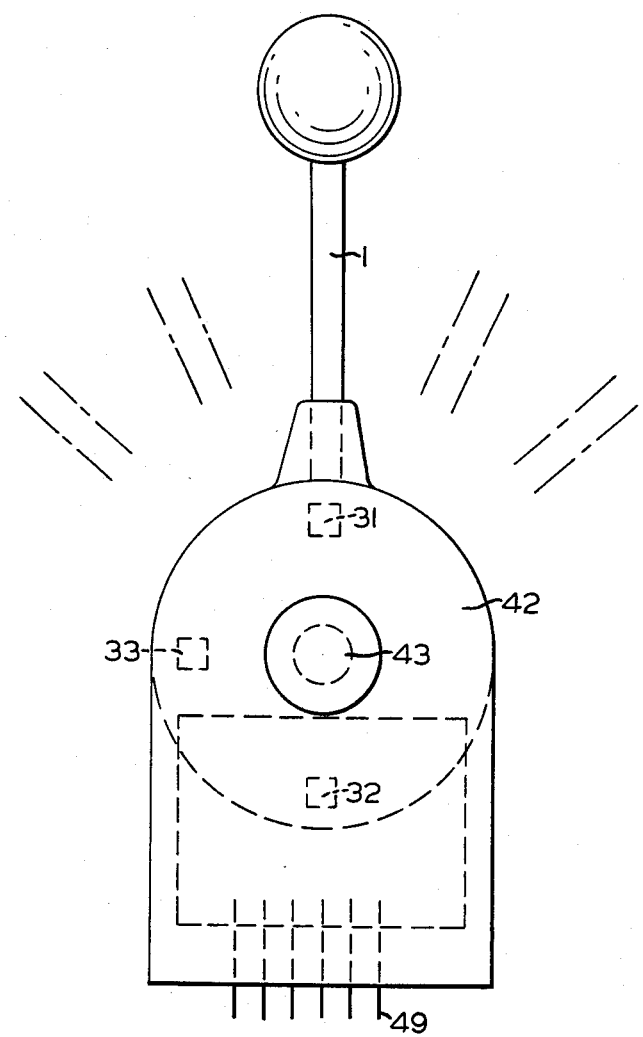

Another configuration of the gear selector is illustrated in FIGS. 17 and 18. On this gear selector, the workings are arranged one behind the other in the same plane. On the shift lever 1, there is a lever head 42, which can be pivoted around the axis of a shaft 43 in the housing 2, perpendicular to the shift level 1. In the lever head 42, are permanent magnets 34 and 35, whose position can be sensed by sensors 31, 32 and 33, sensitive to magnetic fields, installed in the housing 2.

The lever head 42 can be stopped in the individual gears by means of a ball-type detent 44. The sensors 31, 32 and 33 are connected to a bar 14.

The number of sensors required depends on the number of gears to be distinguished. With the three sensors shown, a maximum of $2^3=8$ states or gears can be distinguished. The permanent magnets 42 contained in the lever head are thereby arranged so that for each gear, a different combination of the three sensors is obtained (not shown).

The electrical connections of the bar 14 are run outward by means of a plug device 49.

Figure 20:
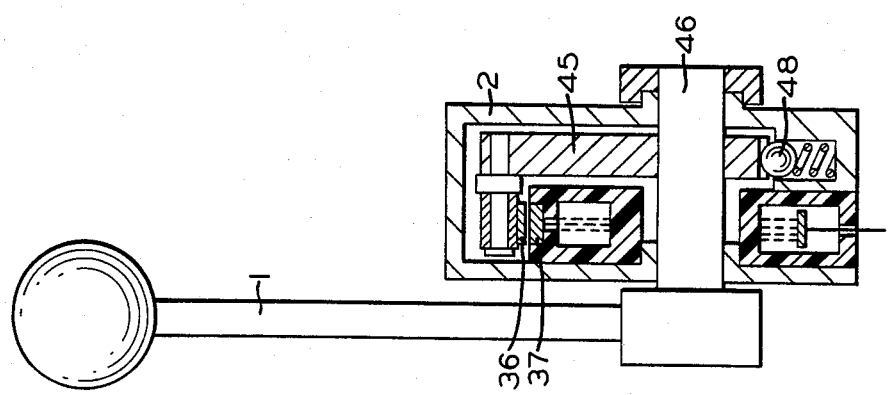
FIGS. 19 and 20, a fourth example of a gear selector as described by the invention.
Figure 19:
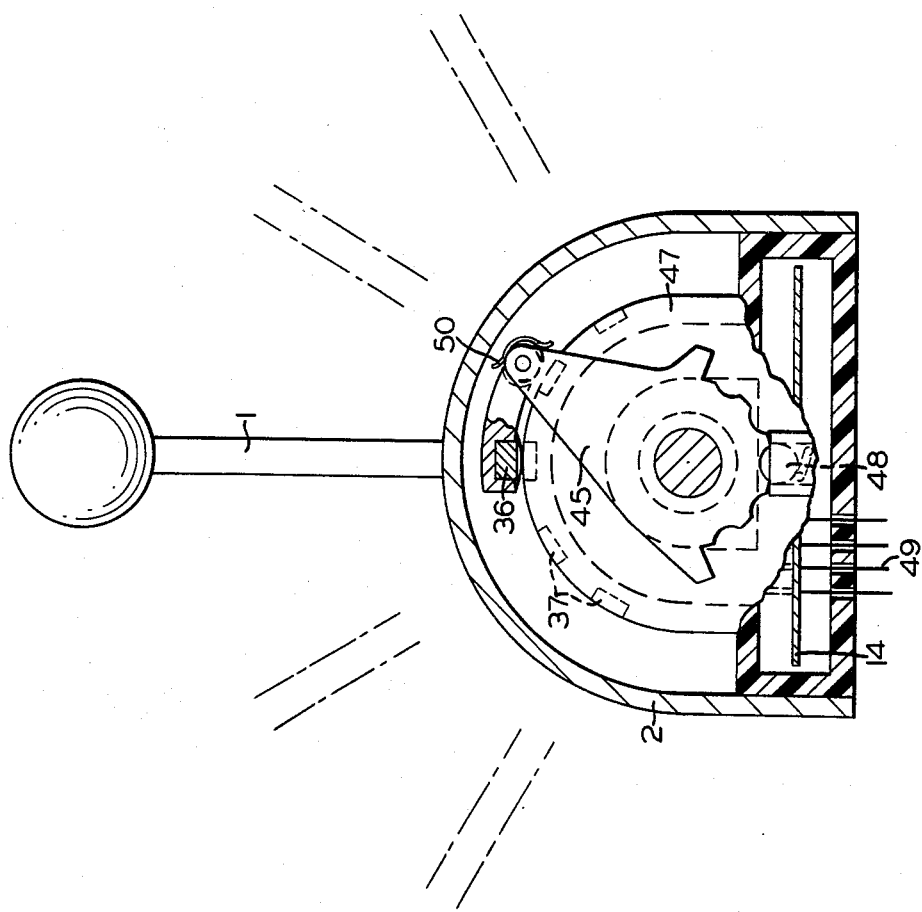

A fourth model of the gear selector unit is illustrated in FIGS. 19 and 20. The shift lever 1 here is fastened perpendicularly to a shaft 46 in the housing 2. The shaft 46 has a lever 45, on the end of which a permanent magnet 36 is flexibly supported. The permanent magnet 36, when gear shift lever 1 is operated, moves along a track 47 formed on a semicircular portion of housing 2 that is coaxial with shaft 46 in which sensors 37 sensitive to a magnetic field are located. The application force for the magnet 36 is produced by a leaf spring 50. The lever 45 can be stopped in each gear position by means of a ball-type detent 48. Each gear is assigned to a single sensor 37 sensitive to a magnetic field.

This design has the advantage that even if the shape of the track is not exactly circular, the distance between the magnet 36 and the sensors 37 set in the track 47 remains always the same.

Having now described the invention what I claim as new and desire to secure by Letters Patent, is:

1. A gear selector unit for manual selection of the gears in a transmission comprising:
   (a) a housing;
   (b) a plurality of magnetic sensors installed in said housing;
   (c) a gear shift lever pivotally connected to said housing by gimbals, so as to rotate about a first axis for selection of the shift path and about a second axis for selection of the desired gear, said gear shift lever comprising:
      (i) a first arm having an arcuate end on which at least one magnet is mounted in magnetic proximity with at least one of said plurality of magnetic sensors to provide an indication of the shift path in which said gear shift lever is positioned by rotation about said first axis; and
      (ii) a second arm having at least one magnet mounted thereon in magnetic proximity with at least one of said plurality of magnetic sensors to provide an indication of the desired gear in the selected shift path by rotation of said gear shift lever about said second axis, thereby providing a signal corresponding to the desired transmission gear according to the gear shift lever position without physical engagement between said magnets and sensors.

2. A gear selector unit as recited in claim 1, further comprising detent means for inhibiting rotation of said gear shift lever about said first axis and said second axis in said different positions thereof.

3. A gear selector unit as recited in claim 1, wherein said first and second axes are at right angles to each other.

4. A gear selector unit as recited in claim 3, further comprising a flat plate forming one wall of said housing on which said magnetic sensors are mounted.

* * * * *